United States Patent
Dutta et al.

(10) Patent No.: US 7,599,937 B2
(45) Date of Patent: *Oct. 6, 2009

(54) SYSTEMS AND METHODS FOR FINE GRAINED ACCESS CONTROL OF DATA STORED IN RELATIONAL DATABASES

(75) Inventors: Tanmoy Dutta, Sammamish, WA (US); Conor Cunningham, Redmond, WA (US); Stefano Stefani, Seattle, WA (US); Girish Chander, Redmond, WA (US); Eric N. Hanson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/696,024

(22) Filed: Apr. 3, 2007

(65) Prior Publication Data

US 2007/0174285 A1    Jul. 26, 2007

Related U.S. Application Data

(63) Continuation of application No. 10/878,152, filed on Jun. 28, 2004, now Pat. No. 7,200,595.

(51) Int. Cl.
*G06F 17/30* (2006.01)

(52) U.S. Cl. .................. 707/9; 707/2; 707/4; 707/3; 707/100; 709/225; 713/165; 713/201; 713/166

(58) Field of Classification Search ................ None
See application file for complete search history.

(56) References Cited

U.S. PATENT DOCUMENTS

| | | | |
|---|---|---|---|
| 5,734,887 A | 3/1998 | Kingberg et al. | |
| 5,911,143 A | 6/1999 | Deinhart et al. | |
| 5,941,947 A * | 8/1999 | Brown et al. | 709/225 |
| 5,943,671 A | 8/1999 | Kleewein et al. | |

(Continued)

OTHER PUBLICATIONS

Jim Czuprynski, Oracle Label Security, Part 1: Overview, DBAsupport.com:Oracle 9i Central: Oracle Label Security, Part 1:Overview, http://www.dbasupport.com/oracle/ora9i/OLS01.shtml, 2005.

(Continued)

*Primary Examiner*—Cam Y T Truong
(74) *Attorney, Agent, or Firm*—Workman Nydegger

(57) ABSTRACT

A system and method for facilitating secure access to database(s) is provided. The system relates to authorizing discriminatory access to relational database data. More particularly, the invention provides for an innovative technique of defining secured access to rows in relational database tables in a way that cannot be spoofed while preserving various optimization techniques. The invention affords a persistent scheme via providing for a security architecture whereby discriminatory access policies on persistent entities can be defined and enforced while preserving set based associative query capabilities.

A particular aspect of the invention relates to the specification of such policies and the technique by which those policies are enforced. With respect to one particular implementation of the invention, creation, modification and deletion of access control lists called security descriptors is provided. The security descriptors can be provisioned independent of rows in tables of the database and can be shared and embody the policy on what permissions are granted to whom when associated with a row.

12 Claims, 8 Drawing Sheets

U.S. PATENT DOCUMENTS

| | | | |
|---|---|---|---|
| 5,956,715 | A | 9/1999 | Glasser et al. |
| 6,085,191 | A * | 7/2000 | Fisher et al. ............ 707/9 |
| 6,275,818 | B1 | 8/2001 | Subramanian et al. |
| 6,289,458 | B1 | 9/2001 | Garg et al. |
| 6,308,173 | B1 | 10/2001 | Glasser et al. |
| 6,334,128 | B1 | 12/2001 | Norcott et al. |
| 6,356,889 | B1 | 3/2002 | Lohman et al. |
| 6,412,070 | B1 | 6/2002 | Van Dyke et al. |
| 6,625,603 | B1 | 9/2003 | Garg et al. |
| 6,715,081 | B1 | 3/2004 | Attwood et al. |
| 6,754,656 | B1 | 6/2004 | Cornwell et al. |
| 6,757,670 | B1 * | 6/2004 | Inohara et al. ............ 707/3 |
| 6,801,903 | B2 | 10/2004 | Brown et al. |
| 7,233,939 | B1 * | 6/2007 | Ziauddin ............ 707/2 |
| 2002/0063154 | A1 | 5/2002 | Hoyos et al. |
| 2003/0229625 | A1 | 12/2003 | Melchior et al. |
| 2004/0019587 | A1 | 1/2004 | Fuh et al. |
| 2004/0243555 | A1 * | 12/2004 | Bolsius et al. ............ 707/3 |
| 2005/0055355 | A1 | 3/2005 | Murthy et al. |

OTHER PUBLICATIONS

International Search Report dated Nov. 8, 2005 for PCT Application Serial No. US04/24161, 4 pages.

Written Opinion dated Nov. 15, 2000 and mailed Nov. 30, 2005 PCT Application Serial No. US04/24161, 7 pages.

Ueli Maurer, the Role of Cryptography in Database Security, SIGMOD 2004, Jun. 13-18, 2004, 6 pages, ACM.

Marianne Winslett, et al., Formal Query Languages for Secure Relational Databases, ACM Transactions on Database Systems, 1994, pp. 626-662, vol. 19 No. 4.

Sushil Jajodia, Database Security and Privacy, ACM Computing Surveys, Mar. 1996, pp. 129-131, vol. 28 No. 1, CRC Press.

Linda M. Null, et al., A Unified Approach For Multilevel Database Security Based on Inference Engines, 1989, pp. 108-111, ACM.

Elisa Bertino, et al., A Logical Framework for Reasoning About Access Control Models, ACM Transactions on Information and System Security, Feb. 2003, pp. 71-127, vol. 6 No. 1, ACM.

Shariq Rizvi, et al., Extending Query Rewriting Techniques for Fine-Grained Access Control, SIGMOD 2004, Jun. 13-18, 2004, 12 pages, ACM.

Tor Didriksen, Rule Based Database Access Control - A Practical Approach, RBAC '97, 1997, pp. 143-151, ACM.

M. Jaishankar Menon, et al., The Access Control Mechanism of a Database Computer (DBC), 5th Workshop on Computer Architecture for Non-numeric Processing, 1980, pp. 17-28, ACM.

* cited by examiner

| | | | |
|---|---|---|---|
| COLUMN$_1$ | ••• | COLUMN$_N$ | SECURITY DESCRIPTOR COLUMN |
| ROW$_1$ | | | SECURITY DESCRIPTOR |
| ⋮ | | | |
| ROW$_M$ | | | |

FIG. 2

| SECURITY DESCRIPTOR IDENTIFIER | ACCESS INFORMATION | PERMISSION | PRINCIPAL(S) |
|---|---|---|---|
| SECURITY DESCRIPTOR$_1$ | | | |
| ⋮ | | | |
| SECURITY DESCRIPTOR$_P$ | | | |

FIG. 3

SYSTEMS AND METHODS FOR FINE GRAINED ACCESS CONTROL OF DATA STORED IN RELATIONAL DATABASES

CROSS-REFERENCE TO RELATED APPLICATION(S)

This application is a continuation of U.S. patent application Ser. No. 10/878,152, filed Jun. 28, 2004, entitled "SYSTEMS AND METHODS FOR FINE GRAINED ACCESS CONTROL OF DATA STORED IN RELATIONAL DATABASES". The entirety of the aforementioned application is incorporated herein by reference.

TECHNICAL FIELD

The present invention relates generally to computer systems, and more particularly to system(s) and method(s) that relate to computer databases.

BACKGROUND OF THE INVENTION

Technological advances in computer hardware, software and networking have lead to increased demand to exchange information electronically rather than through conventional techniques such as paper and telephone correspondence, for example. Electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program, for example, can quickly search and select desired pieces of data. Traditionally, data within a database is organized via one or more tables, wherein respective tables comprise a set of records and a record comprises a set of fields. Records are commonly indexed as rows within a table and the record fields are commonly indexed as columns such that a row/column pair of indices can reference a particular datum within a table.

Data stored in a database often includes personal (e.g., bank account and social security numbers) and sensitive information (e.g., medical records) and may not be backed up via hard copies. Therefore, security related to databases and data stored therein is growing in importance. However, many of today's database security techniques can be breached, for example, through software holes and/or by hackers with malicious intent.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating secure access to database(s). With the increasing popularity of computers, more and more data is stored in databases, for example, relational databases. In relational databases, most of the data is stored as rows in one or more tables. The databases can be accessed by one or a plurality of entities. Due to the nature of data stored in databases, authorizing discriminatory access (e.g., no access, read access and/or read/write access) to that data is of significant importance.

At the heart of the popularity of relational databases, is the ability to perform associative queries over tables. Sets of entities stored in tables can be accessed using a set processing language (e.g., SQL (Structured Query Language)). The language specifies one or more tables as the source of the data and outputs only those row(s), if any, that satisfy a given condition.

In addition, many relational databases optimize such queries based on the various access paths or indices present on the tables. Thus, in accordance with an aspect of the present invention, the system provides for an innovative technique of defining secured access to rows in such tables in a way that it cannot be spoofed while preserving the various optimization techniques that exist today.

In accordance with an aspect of the present invention, a system that facilitates secure access to a database having a database engine that accesses a database, and, a security descriptor store is provided. Optionally, the system can include the database.

The database stores data in a structured format. For example, the database can be a relational database, an object database and/or an object relational database. With respect to relational databases, a set of entities with the same structure is called a table and each entity is called a row. The components of the structure are called columns. A relational database can include zero, one or a plurality of tables.

An aspect of the present invention provides for at least one of the tables associated with the database to include a column storing security information, for example, a security descriptor (e.g., an identifier associated with security information stored in the security descriptor store).

The security descriptor store stores one or a plurality of security descriptors. Each security descriptor controls discriminatory access to one or more resources that it is associated with. The security information embodied in a security descriptor can include, for example a list of, (1) whether access is granted or denied, (2) the kind of access (e.g., permission, for example, read only and/or read/write), and, (3) the principal to whom the security information applies. For example, the security descriptor store can be an ordered set of access control entities.

The security descriptor (e.g., access control list) can quickly become very long, based on the security requirements of the nature of the data being stored in the row and the complexity of the application through which the data is being accessed. Additionally, in a majority of cases, the number of distinct access control lists associated with the rows of the table is much smaller than the actual number of rows. For example, when modeling a file-system as a table, where each row in the table refers to the file or folder, one can potentially have hundreds of thousands of rows in such a table. But the number of distinct access control lists, is in the order of hundreds. In other words, a lot of the rows have the same security policy associated with them.

The database engine receives query information, for example, from a user. The query information includes a query requested to be performed on the database and a user context associated with the initiator of the query (e.g., user name, user identifier and/or type of user).

In executing the query, the database engine employs the security descriptor associated with row(s) of the database accessed during query processing and the user context information associated with the query to determine whether the user has the requested access to the row. Thus, the initiator of the query is only provided information from the database to which the user has access rights (e.g., to view and/or modify).

Yet another aspect of the present invention provides, as part of a policy specification, a SQL programming language (e.g., TSQL) that is augmented with a new set of statements that allow for the creation, modification and deletion of security descriptor(s) e.g., access control lists). These security descriptor(s) (e.g., access control lists) can include other security related information. For example, security descriptors can be provisioned independent of rows in tables, can be shared and can embody the policy on what permissions are granted and to whom when associated with a row.

In traditional relational databases, security policies are not associated with rows of tables. Thus, in accordance with an aspect of the present invention, to indicate that the rows of a particular table in the database system are protected by a security policy, the SQL statements to create and alter tables have been extended to indicate that fact. One of the columns in the definition of these tables is optionally extensible with an attribute that indicates that the column embodies the security policy. The value of that column refers to the identity of a security descriptor discussed previously (e.g., 4 byte code). In one example, if the value of the column is NULL, the row is not secured by any policy. Otherwise, the policy of access control for that row is discriminated based on the corresponding security descriptor and the associated information stored in the security descriptor store.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 2 is a diagram of an exemplary table in accordance with an aspect of the present invention.

FIG. 3 is a diagram of an exemplary security descriptor store in accordance with an aspect of the present invention.

DETAILED DESCRIPTION OF THE INVENTION

Figure 1:
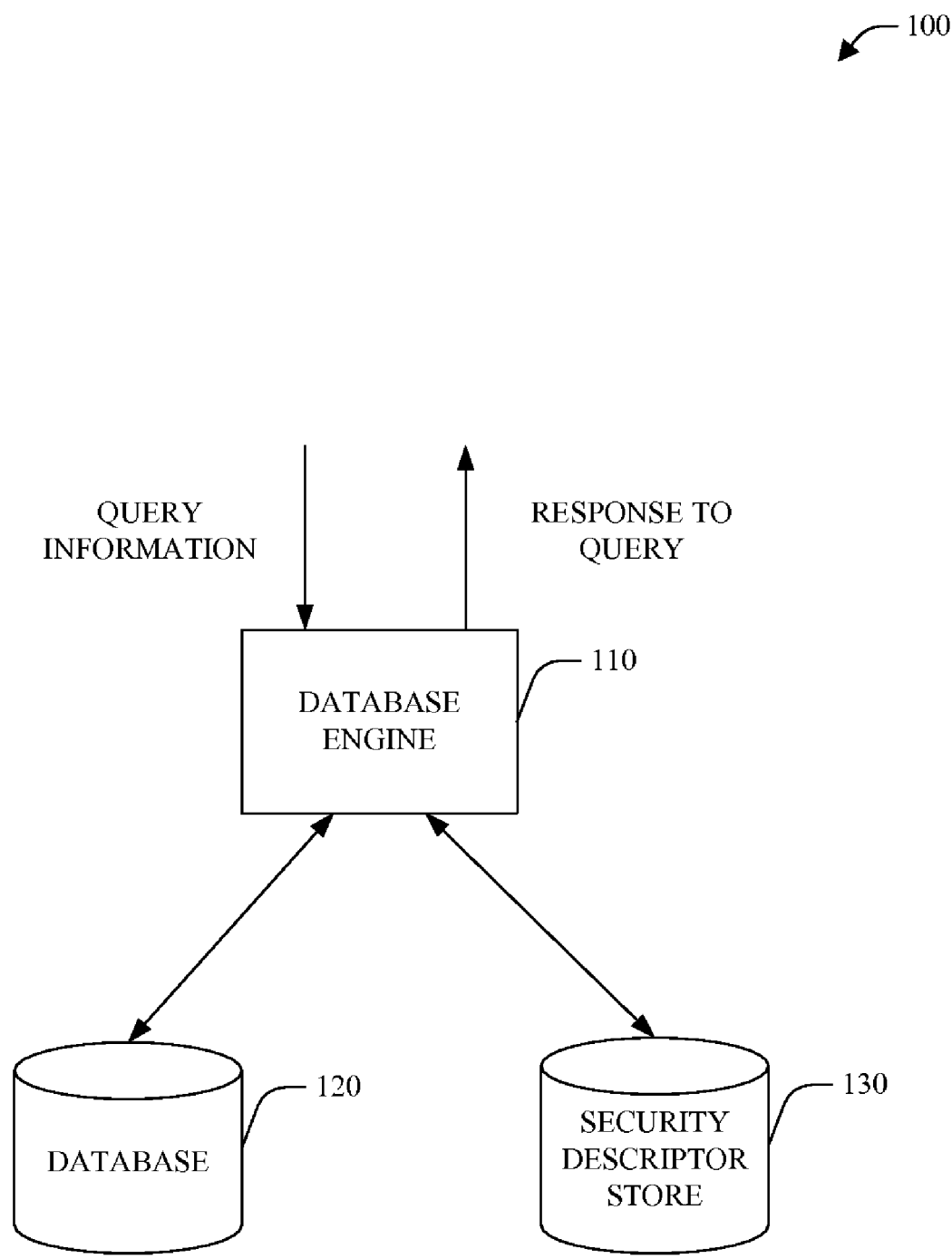
FIG. 1 is a block diagram of a system that facilitates secure access to a database in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, a system 100 that facilitates secure access to a database in accordance with an aspect of the present invention is illustrated. The system 100 includes a database engine 110 that can access a database 120, and, a security descriptor store 130. Optionally, the system 100 can further include the database 120.

With the increasing popularity of computers, more and more data is stored in databases, for example, relational databases. In relational databases, most of the data is stored as rows in one or more tables. The databases can be accessed by one or a plurality of entities. Due to the nature of data stored in databases, authorizing discriminatory access (e.g., no access, read access and/or read/write access) to that data is of significant importance.

At the heart of the popularity of relational databases, is the ability to perform associative queries over tables. Sets of entities stored in tables can be accessed using a set processing language (e.g., SQL (Structured Query Language)). The language specifies one or more tables as the source of the data and outputs only those row(s), if any, that satisfy a given condition.

In addition, many relational databases optimize such queries based on the various access paths or indices present on the tables. Thus, in accordance with an aspect of the present invention, the system 100 provides for an innovative technique of defining secured access to rows in such tables in a way that cannot be spoofed while preserving the various optimization techniques that exist today.

The database 120 stores data in a structured format. For example, the database 120 can be a relational database, an object database and/or an object relational database. With respect to relational databases, a homogenous set of entities with the same structure is called a table and each entity is called a row. The components of the structure are called columns. A relational database can include one or a plurality of tables.

In accordance with an aspect of the present invention, at least one of the tables associated with the database 120 include a column storing security information, for example, a security descriptor (e.g., an identifier associated with security information stored in the security descriptor store 130, as discussed below).

Referring briefly to FIG. 2, an exemplary table 200 in accordance with an aspect of the present invention is illustrated. The table 200 includes data columns 210 and rows 220. Additionally, the table 200 includes a security descriptor column 230. For example, the security descriptor column 230 can store, for a particular row, a security descriptor associated with that row. In one example, the security descriptor is an identifier associated with a security descriptor store 130.

Returning to FIG. 1, the security descriptor store 130 stores security information embodied by one or more security descriptors. The security information can include, for example, (1) whether access is granted or denied, (2) the kind of access (e.g., permission, for example, read only and/or read/write), and, (3) the principal to whom the security information applies. For example, the security descriptor store 130 can be an ordered set of access control entities.

Turning briefly to FIG. 3, an exemplary security descriptor store 300 in accordance with an aspect of the present invention is illustrated. The security descriptor store 300 includes one or more security descriptor(s) 310.

In this example, a particular security descriptor 310 includes access information 320, for example, access granted and/or access denied. The security descriptor 310 further includes permission 330 that identifies the kind of access associated with the particular security descriptor 310, for example, no access, read only access and/or read/write access. The security descriptor 310 further includes principal(s) 340 to whom the security descriptor 310 applies (e.g., user name(s), group(s) of user(s), user identifier(s) and/or type(s) of user(s)).

The security descriptor 310 (e.g., access control list) can quickly become very long, based on the security requirements of the nature of the data being stored in the row and the complexity of the application thru which the data is being accessed. Additionally, in majority of the cases, the number of distinct security descriptors associated with the rows of the table is much smaller than the actual number of rows. For example, when modeling a file-system as a table, where each row in the table refers to the file or folder, one can potentially have hundreds of thousands of rows in such a table. But the number of distinct security descriptors, is in the order of hundreds. In other words, a lot of the rows have the same security policy associated with them. Additionally, in one example, all the security descriptors can be cached in memory for fast lookup when a database row is accessed.

Returning to FIG. 1, the database engine 110 receives query information, for example, from a user. The query information includes a query requested to be performed on the database 120 and a user context associated with the initiator of the query (e.g., user name, user identifier and/or type of user).

In executing the query, the database engine 110 evaluates the security descriptor associated with accessed row(s) of the database 120 and the user context information associated with the query to determine whether the user has the requested access to the row. Thereafter, the database engine 110 provides a response to the query information based on the query and, significantly, the user context information. Thus, the initiator of the query is only provided information from the database 120 to which the user has access rights (e.g., to view and/or modify).

For example, for a database 120 having a single table with the following entries:

TABLE 1

| Name | State | Salary | Security Descriptor |
|---|---|---|---|
| Jeff | Ohio | $5,000 | 1 |
| Joe | Washington | $10,000 | 2 |
| Sally | Ohio | $25,000 | 3 | and an associated security descriptor store 130 having the following security descriptors:

TABLE 2

| Security Descriptor | Access Control List (Access: Permission: Grantee Principal) |
|---|---|
| 1 | Grant: Read: Jeff; Grant: Read/Write: Administrator |
| 2 | Deny: Read: Joe; Grant: Read/Write: Administrator |
| 3 | Deny: Read: Sally; Grant: Read/Write: Administrator |

In this example, when user Jeff queries the database 120 (Table 1) for "all entries", "Jeff" is the user context provided with the query to the database engine 110. Thereafter, the database engine 110 queries the database 120, and preliminarily receives all three rows. However, the database engine 110 then retrieves the security information stored in the security descriptor store 130 associated with each of the three rows and based on the user context, only the first row, is returned since that is the only row user Jeff is authorized to read. However, if the Administrator runs the same query (e.g., "all entries"), all three rows are returned since the Administrator is authorized to read and/or write all three rows.

In accordance with an aspect of the present invention, as part of a policy specification, a SQL programming language (e.g., "TSQL") was augmented with a new set of statements that allow for the creation, modification and deletion of security descriptor store(s) 130, 300 (e.g., access control lists). These security descriptor store(s) 130, 300 (e.g., access control lists) can include other security related information. For example, security descriptors can be provisioned independent of rows in tables, can be shared by multiple rows or other entities in the database system and can embody the policy on what permissions are granted and denied and to whom when associated with a row.

In traditional relational databases, security policies are not associated with rows of tables. Thus, in accordance with an aspect of the present invention, to indicate that the rows of a particular table in the database system are protected by a security policy, the SQL statements to create and alter tables have been extended to indicate that fact. One of the columns in the definition of these tables is optionally extensible with an attribute that indicates that the column embodies the security policy. The value of that column refers to the identity of a security descriptor discussed previously (e.g., 4 byte code). In one example, if the value of the column is NULL, the row is not secured by any policy. Otherwise, the policy of access control for that row is discriminated based on the corresponding security descriptor and the associated information stored in the security descriptor store 130, 300. In yet another example, the default value of the column can be set to the identity of the security descriptor that embodies the default security policy of the table.

It is to be appreciated that the system 100, the database engine 110, the database 120 and/or the security descriptor store 130 can be computer components as that term is defined herein.

Figure 4:
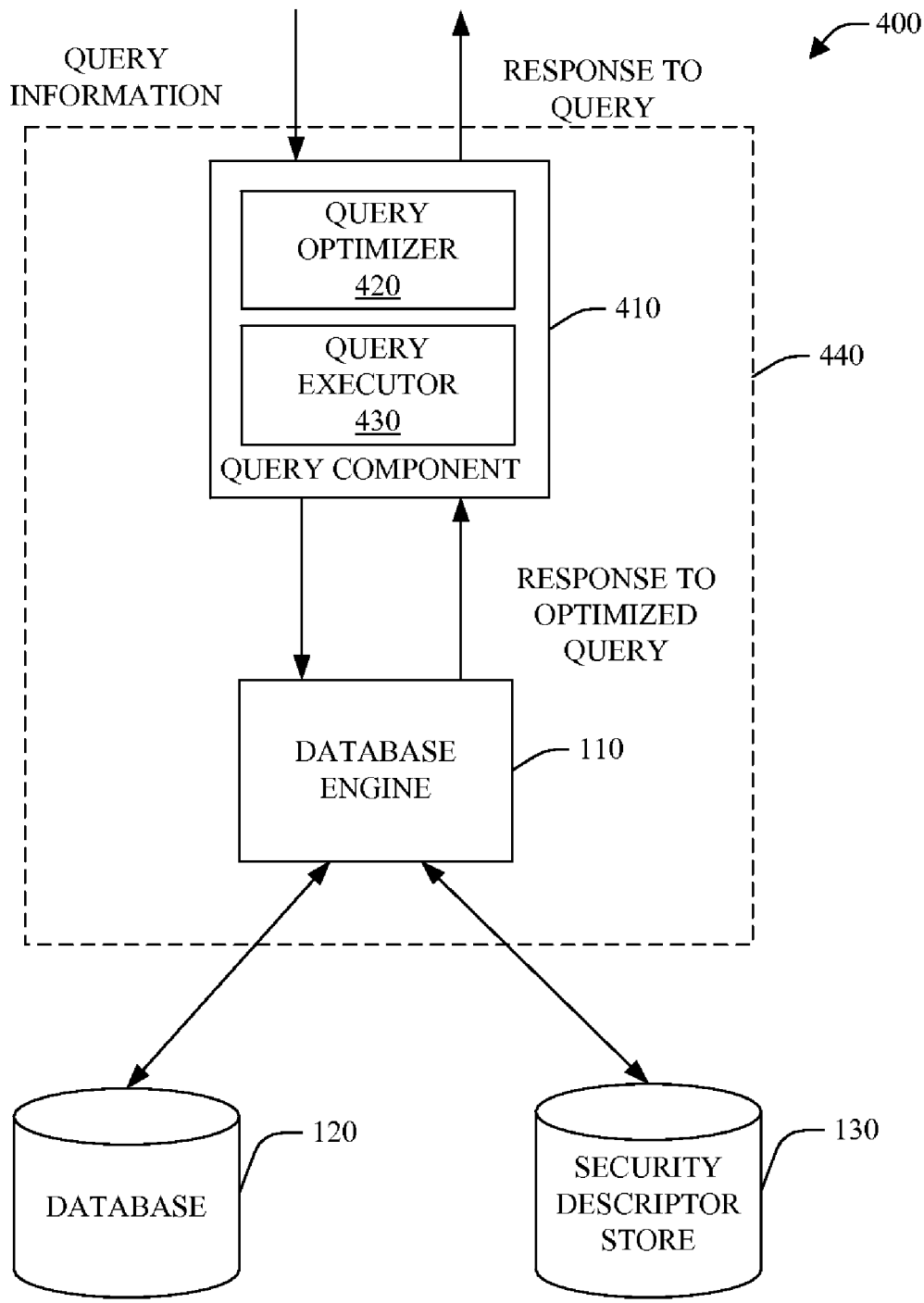
FIG. 4 is a block diagram of a system that facilitates secure access to a database in accordance with an aspect of the present invention.

Referring next to FIG. 4, a system 400 that facilitates secure access to a database in accordance with an aspect of the present invention is illustrated. The system 400 includes a database engine 110, a database 120, a security descriptor store 130, and, a query component 410. The query component 410 can include a query optimizer 420 and a query executor 430. Optionally, the query component 410 and the database engine 110 can form a query database engine component 440.

When a query is posed to the query component 410, the query optimizer 420 can determine the "best way" to answer that query ("optimization"). For example, the query component 410 can employ a cost-based optimization strategy whereby the least expensive way to execute the query is chosen to be the plan.

Those skilled in the art will recognize that the optimization process is complex. The query component 410 can employ state of the art technologies in enumerating possible plans and pruning out the expensive ones. Indexes on tables play a significant role in reducing the cost of access to data in these tables. It is to be appreciated that any type of optimization process suitable for carrying out the present invention can be employed and all such types of optimization technologies are intended to fall within the scope of the hereto appended claims.

Significantly, when rows of a table, secured by security policies in the form of security descriptors are accessed, the database engine 110, before even considering the rows as input for constructing the query result, enforces the security policy by verifying that the requester of the query has the permission to read the rows based on the policy determined by the security descriptor associated with each row. Those skilled in the art will appreciate that the model of security described hereto equates visibility of a row to a principal executing the query to a successful evaluation of the security descriptor associated with that row.

Conventional database security systems have enforced security policies by grafting a condition that checks that the row is accessible as part of the original query. In modern relational database systems, the query plan that gets executed is often quite different from the query actually posed by the requester. Table access re-ordering is done to reduce costs of accessing the rows. As a fall out of this re-ordering, it is possible for a malicious person performing the query to see extra data, by providing side-effecting functions as part of the query. Most conventional database security systems are susceptible to such spoofing attacks when employed to attempt to enforce fine-grained access control.

To thwart the problem and at the same time not perturb the optimization process, the present invention provides an innovative scheme where it ensures that all access paths to the table contain the column having the security descriptors. These access paths to the table include, but are not limited to the table itself stored either as a heap (un-ordered collection) or a clustered or a non-clustered index on the table, and materialized views possibly defined on the table. [0]As a result of including the security descriptor column in all access paths, query optimization becomes orthogonal to fine-grained security enforcement. Accordingly, irrespective of how the query is re-ordered (e.g., optimized by the query optimizer 410), at the time the rows (e.g., data elements in tables, indexes, materialized views and any other access paths are all considered to be "rows") are fetched thru any defined access paths, the two relevant pieces of information, that is, the security policy associated with the row and the current user context, are available. The result is a completely non-spoof-able security enforcement without sacrificing the benefits of optimizing (e.g., re-ordering) the query.

It is to be appreciated that such an un-spoof-able scheme is made possible by virtue of the fact that the security information about a row is stored physically with every partially or fully redundant copy of the row (e.g., index record) and that the enforcement of security is made at the time any row is every emanated to construct a result-set.

The present invention thus enables set oriented operations on sets of persistent entities without drastically changing the way operating systems define security policies on persistent entities—that is, via security descriptors.

It is to be appreciated that the system 400, the query component 410, the query optimizer 420 and/or the query executor 430 can be computer components as that term is defined herein.

Figure 5:
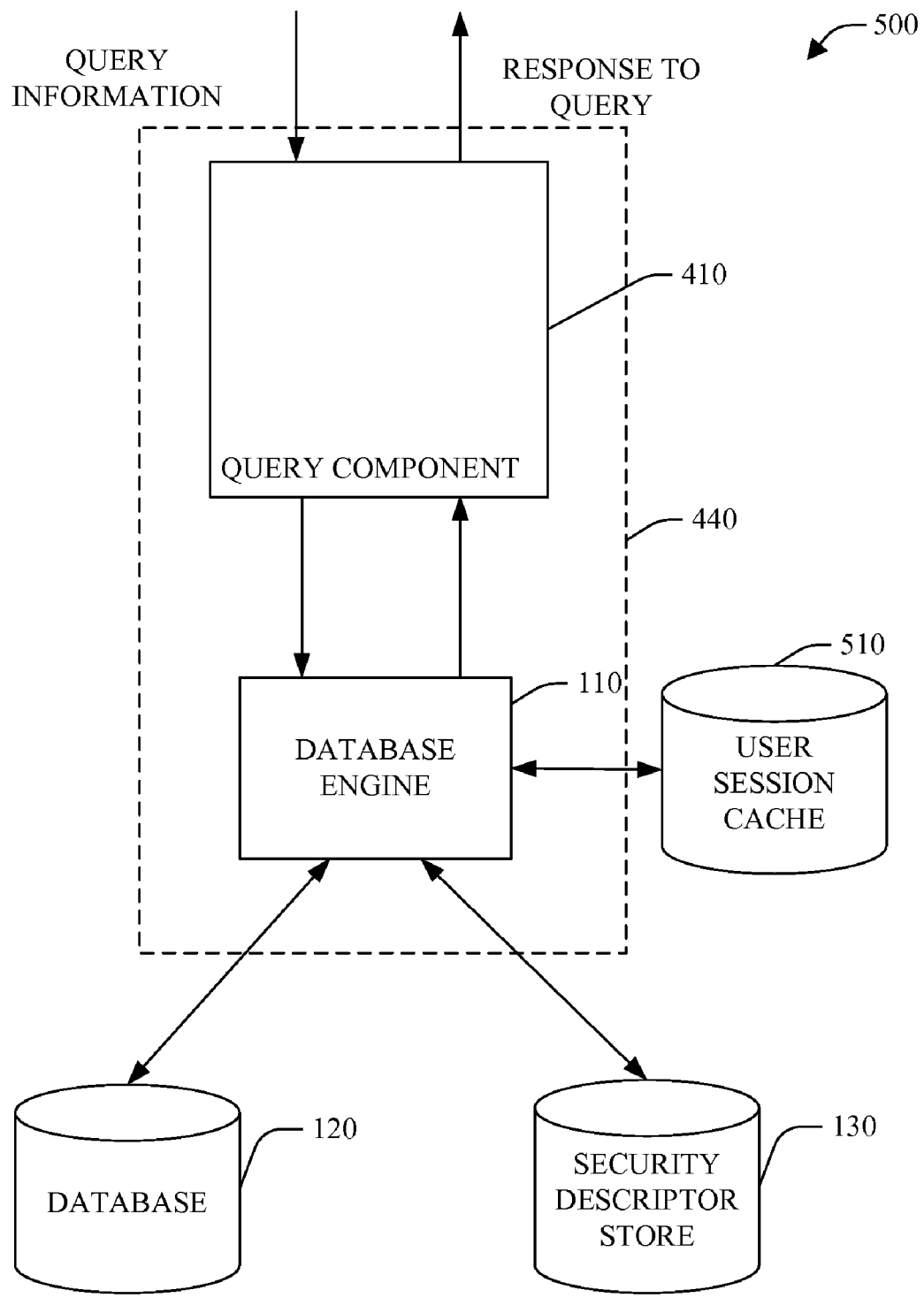
FIG. 5 is a block diagram of a system that facilitates secure access to a database in accordance with an aspect of the present invention.

Referring next to FIG. 5, a system 100 that facilitates secure access to a database in accordance with an aspect of the present invention is illustrated. The system 500 includes a database engine 110, a database 120, a security descriptor store 130, a query component 410 and a user session cache 510.

The system 500 employs the user session cache 510 which is associated with the user's session. The cache 510 stores a computed result of whether the current security context has a given permission with respect to a security descriptor. Therefore, the check to see whether a principal has access to an object given that object's security descriptor, is evaluated only once per query. If two rows of the table, have the same security policy, that is have the same security descriptor, the result of whether the initiator of the query has access to the row or not, is evaluated for the first time and the result is stored in the cache 510. The cached result is employed for the second row.

The cache 510 becomes extremely useful when many rows have the same security policy—which can be the case, for example, in file systems and similar applications.

It is to be appreciated that the system 500 and/or the user session cache can be computer components as that term is defined herein.

As mentioned previously, the system(s) 100, 400 and/or 500 can be employed to facilitate secure access to file(s), folders, contacts, email messages and other persistent entities in databases. For example, a database associated with a file system can include one or more tables that can store information regarding files and/or folders. The table(s) can be employed by the system(s) 100, 400 and/or 500 so that information can be reasoned about and searched using standard relational technique(s). The system(s) 100, 400 and/or 500 can enhance file systems by addressing the need of a persistent file system scheme that requires a security architecture whereby discriminatory access policies on persistent entities can be defined and enforced while preserving set based associative query capabilities.

Figure 6:
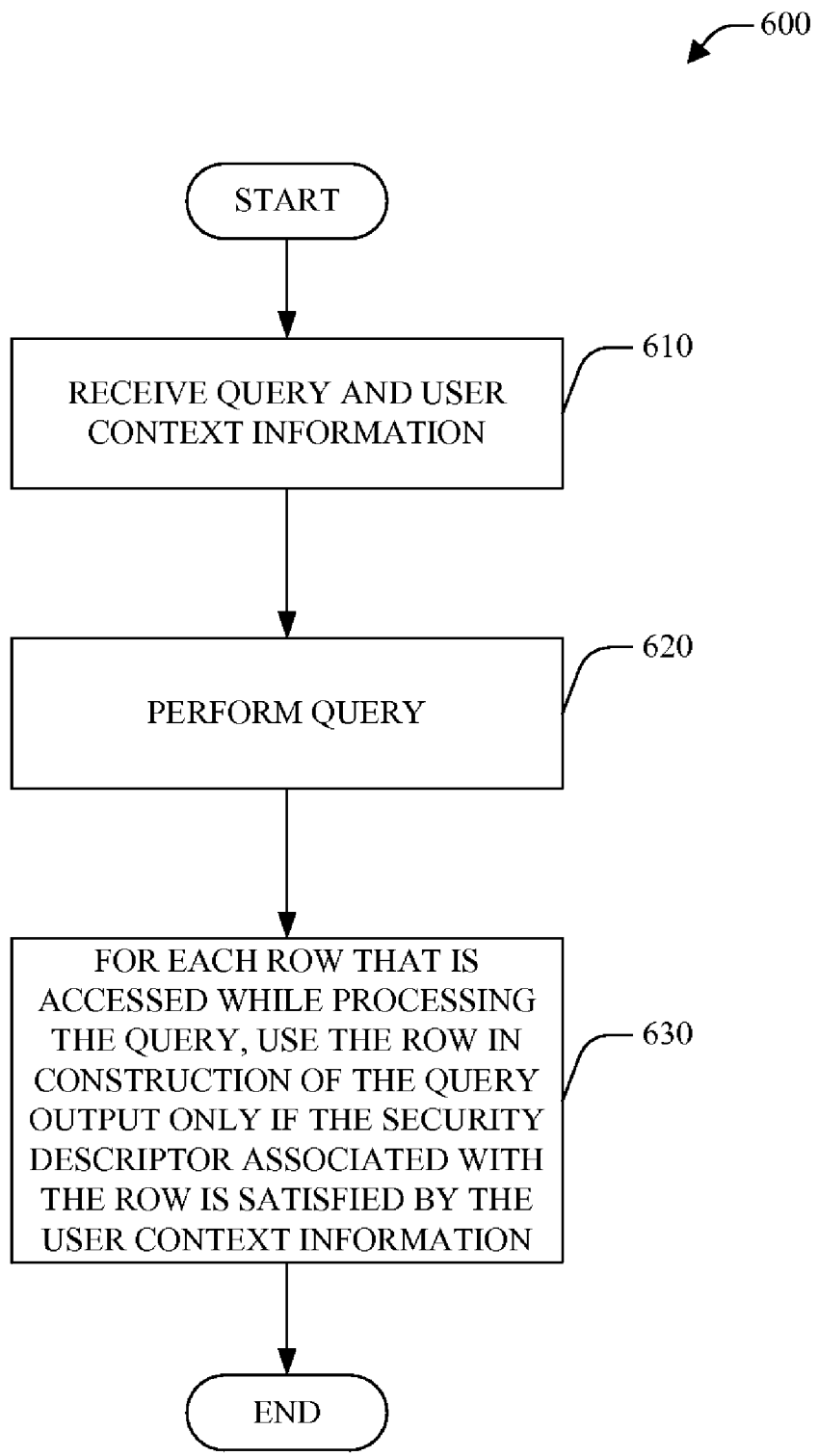
FIG. 6 is a flow chart of a method of securely accessing data stored in a database in accordance with an aspect of the present invention.
Figure 7:
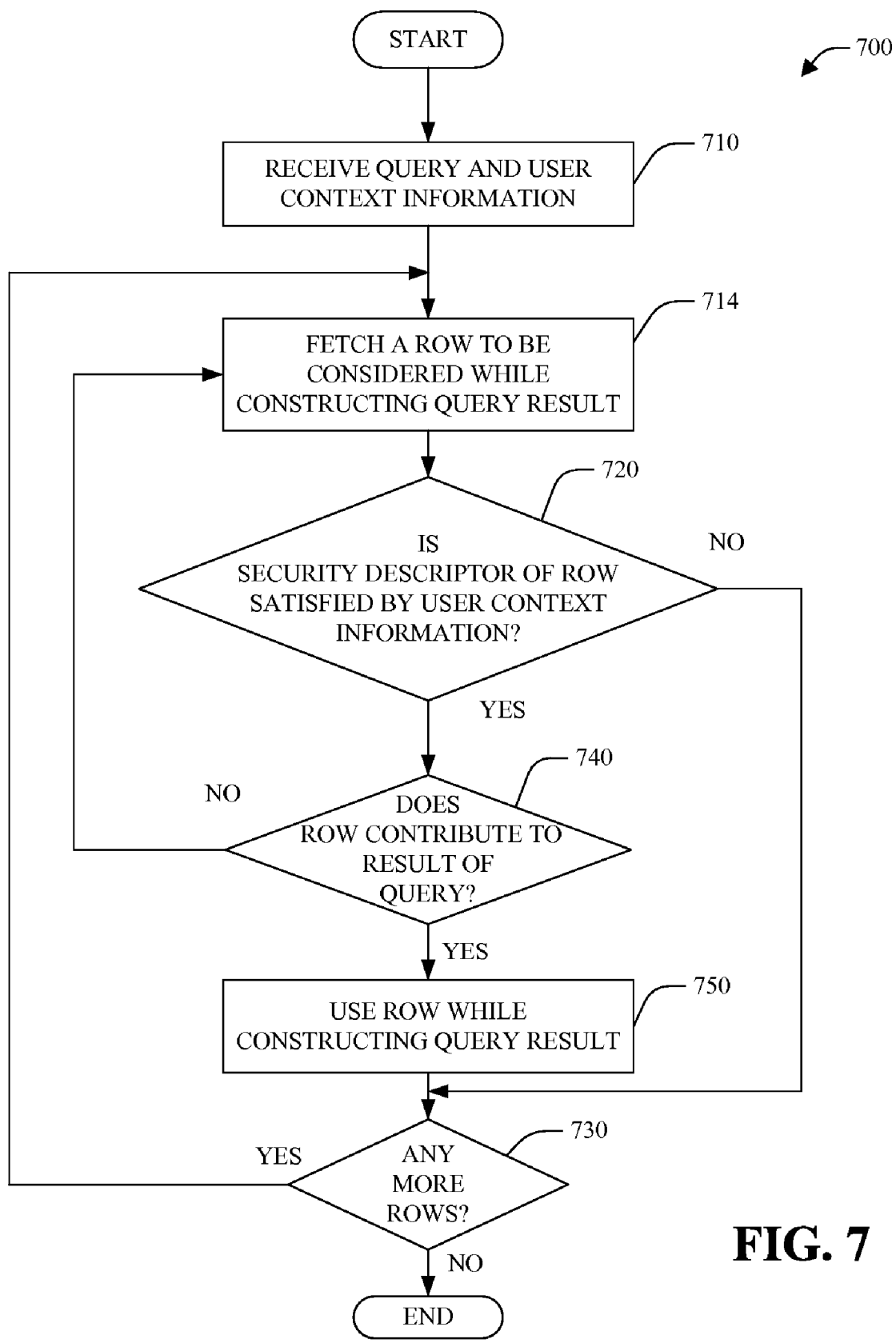
FIG. 7 is a flow chart of a method of securely accessing data stored in a database in accordance with an aspect of the present invention.
Figure 8:
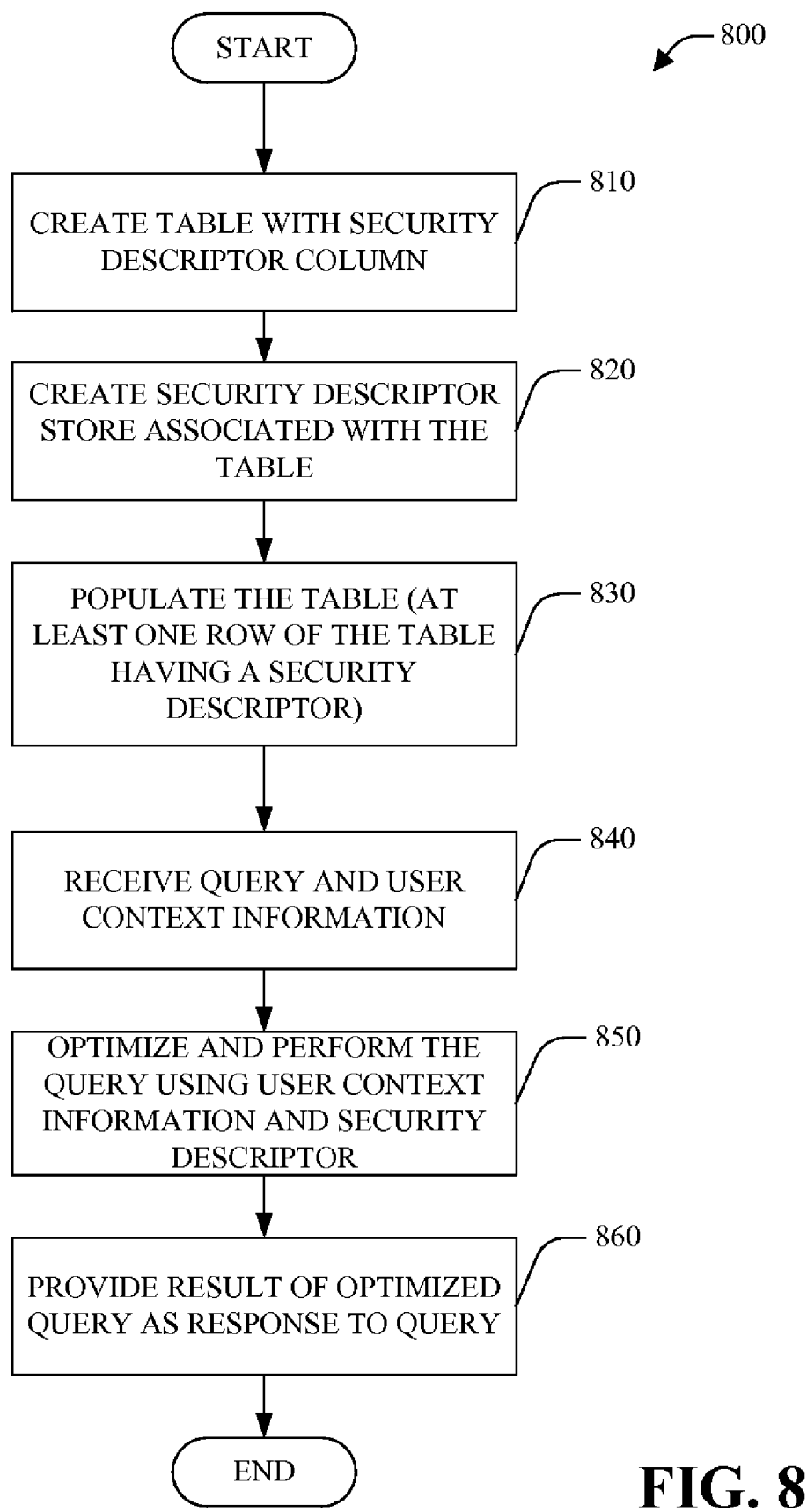
FIG. 8 is a flow chart of a method facilitating a secure database in accordance with an aspect of the present invention.

Turning briefly to FIGS. 6-8, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that performs particular tasks or implement particular abstract data types. Typically the functionality of the program modules may be combined or distributed as desired in various embodiments.

Referring to FIG. 6, a method of securely accessing data stored in a database 600 in accordance with an aspect of the present invention is illustrated. At 610, a query and user context information is received. At 620, the query is performed (e.g., by a query component 410). At 630, for each row that satisfies the query, the row is considered as input during construction of the query output only if the security descriptor associated with the row is satisfied by the user context information.

Next, referring to FIG. 7, a method of securely accessing data stored in a database 700 in accordance with an aspect of the present invention is illustrated. At 710, a query and user context information is received. At 714, a row to be considered while constructing a query result is fetched. At 720, a determination is made as to whether a security descriptor of a row is satisfied by the user context information. If the determination at 720 is NO, processing continues at 730. If the determination at 730 is YES, at 740, a determination is made as to whether the row contributes to the result of the query. If the determination at 740 is NO, processing continues at 714. If the determination at 740 is YES, at 750, the row is used in constructing the query result.

At 730, a determination is made as to whether there are any more row(s). If the determination at 730 is YES, processing continues at 720. If the determination at 730 is NO, no further processing occurs.

Turning to FIG. 8, a method facilitating a secure database 800 in accordance with an aspect of the present invention is illustrated. At 810, a table is created with a security descriptor column. At 820, a security descriptor store associated with the table is created. At 830, the table is populated (e.g., at least one row of the table having a security descriptor identifier).

At 840, a query and user context information is received. At 850, the query is optimized and performed using the user context information and security descriptor(s) of the table. At 860, the result of the optimized query is provided as a response to the query.

Figure 9:
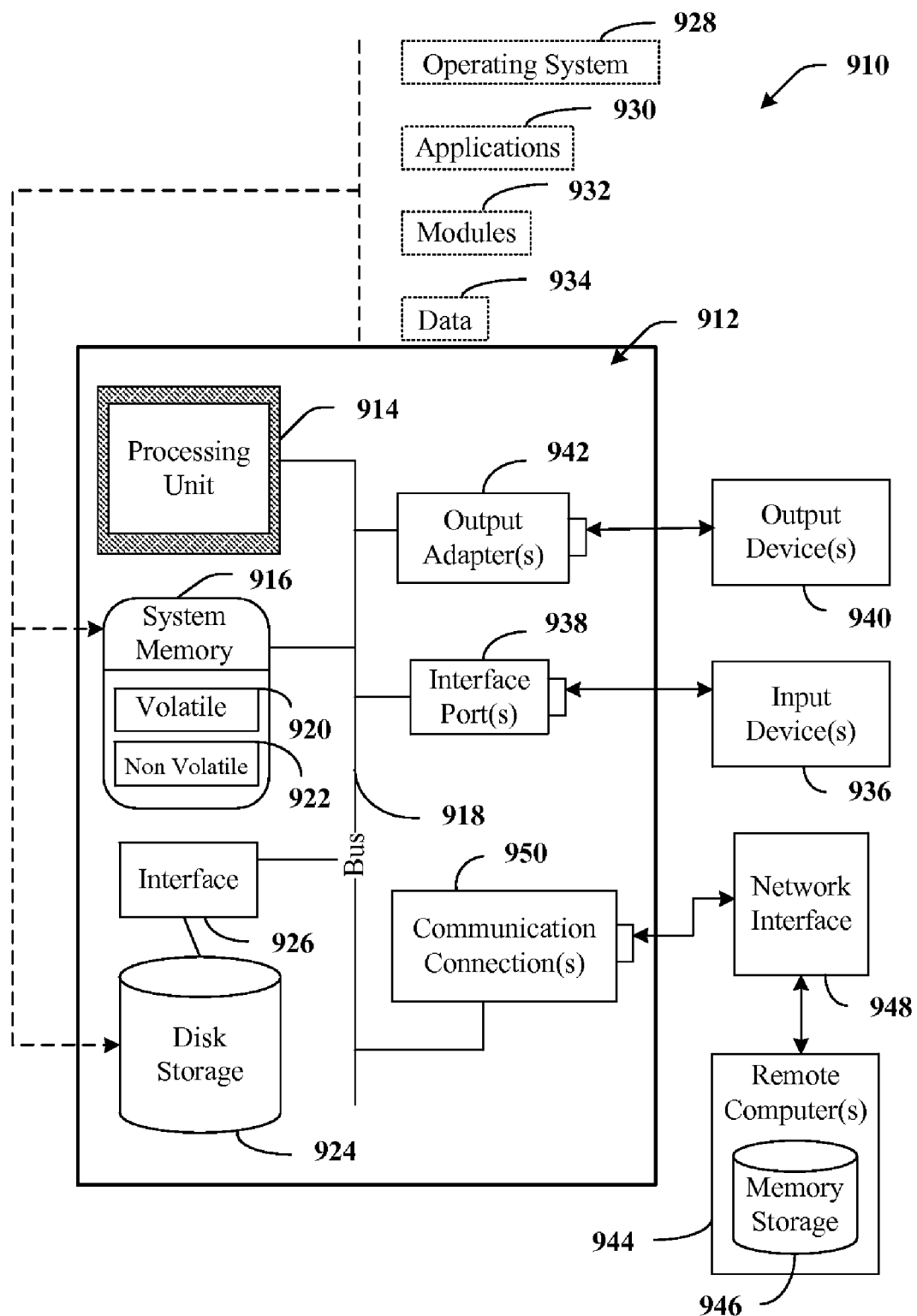
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for facilitating a secure database, the system comprising:

a memory having stored therein computer executable components;

a first component that creates a table with a security descriptor column;

a second component that creates a security descriptor store associated with the table, wherein the security descriptor store comprises at least one security descriptor that includes access information, permission that identifies a kind of access associated with the at least one security descriptor, and one or more principals to whom the at least one security descriptor applies, wherein the one or more principals include at least one of one or more user names, one or more groups of users, one or more user identifiers, or one or more types of users;

a third component that populates at least one row of the table with a security descriptor identifier;

a fourth component that receives a query and user context information;

a fifth component that associates a row of the table with security information, wherein the table comprises at least one row and at least two columns, wherein one of the at least two columns stores a security descriptor associated with the row of the table, wherein the security descriptor associated with the row of the table identifies the security information stored in the security descriptor store, wherein the security descriptor associated with the row of the table is included in all access paths to the table, and wherein access paths to the table include at least one of following: an access path to the table stored as an un-ordered collection; an access path to a clustered index on the table; an access path to a non-clustered index on the table; or an access path to materialized views defined on the table;

a sixth database engine component that provides a response to the query, wherein the response comprises rows, if any, that satisfy the query, and wherein the security information associated with the row of the table is satisfied by the user context information;

a seventh query component that determines an optimal way to answer the query based on a cost-based optimization strategy, wherein the query is optimized prior to providing the response; and a processor that executes the computer executable components.

2. The system of claim 1, wherein the access information includes whether access is granted or denied.

3. The system of claim 2, wherein the permission that identifies the kind of access associated with the at least one security descriptor includes no access permission, read only access permission, and read/write access permission.

4. The system of claim 1, wherein information stored in the security descriptor associated with the row comprises a kind of access granted or denied to a principal.

5. The system of claim 1, wherein information stored in the security descriptor store comprises a kind of access.

6. The system of claim 1, wherein information stored in the security descriptor store comprises a principal to whom the security information applies.

7. The system of claim 1, wherein the at least one security descriptor is an ordered set of access control entities.

8. A computer-implemented method for facilitating a secure database, the method comprising:

creating a table with a security descriptor column;

storing the table in a memory utilizing a processor;

creating a security descriptor store associated with the table, wherein the security descriptor store comprises at least one security descriptor that includes access information, permission that identifies a kind of access associated with the at least one security descriptor, and one or more principals to whom the at least one security descriptor applies, wherein the one or more principals includes at least one of one or more user names, one or more groups of users, one or more user identifiers, or one or more types of users;

populating at least one row of the table with a security descriptor identifier; receiving a query and user context information;

associating the at least one row of the table with security information, wherein the table comprises one or more rows and at least two columns, wherein one of the at least two columns stores a security descriptor associated with the at least one row of the table, wherein the security descriptor associated with the at least one row of the table identifies the security information stored in the security descriptor store, wherein the security descriptor associated with the at least one row of the table is included in all access paths to the table, and wherein an access path to the table includes at least one of following: an access path to the table stored as an un-ordered collection; an access path to a clustered index on the table; an access path to a non-clustered index on the table; or an access path to materialized views defined on the table;

providing a response to the query, wherein the response comprises rows, if any, that satisfy the query, and wherein the security information associated with the at least one row of the table is satisfied by the user context information; and providing a query optimizer that determines an optimal way to answer the query, wherein the query is optimized prior to providing the response, and wherein the query optimizer employs a cost-based optimization strategy.

9. The method of claim 8, wherein providing a response to the query comprises:

for each row of the table accessed, determining whether a security descriptor associated with the row is satisfied by the user context information.

10. The method of claim 8, wherein the database is provisioned independent of the security information stored in the security descriptor.

11. The method of claim 8, wherein the access information includes whether access is granted or denied.

12. The method of claim 8, wherein the permission that identifies the kind of access associated with a security descriptor includes no access permission, read only access permission, and read/write access permission.

* * * * *